United States Patent
Aoki et al.

(10) Patent No.: US 6,782,070 B2
(45) Date of Patent: *Aug. 24, 2004

(54) METHOD OF HANDLING A LARGE STRUCTURE IN A REACTOR BUILDING

(75) Inventors: Masataka Aoki, Hitachi (JP); Takahiro Adachi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 10/299,780

(22) Filed: Nov. 20, 2002

(65) Prior Publication Data

US 2003/0128795 A1 Jul. 10, 2003

Related U.S. Application Data

(63) Continuation of application No. 09/805,992, filed on Mar. 15, 2001.

(30) Foreign Application Priority Data

Mar. 31, 2000 (JP) ........................................ 2000-101180

(51) Int. Cl.[7] ............................................ G21C 19/00
(52) U.S. Cl. ...................................................... 376/260
(58) Field of Search ................................ 376/260–263

(56) References Cited

U.S. PATENT DOCUMENTS

| 5,600,686 | A | 2/1997 | Stoss ........................... 376/260 |
| 6,198,787 | B1 | 3/2001 | Hasegawa et al. ........... 376/260 |
| 6,252,922 | B1 | 6/2001 | Hasegawa et al. ........... 376/260 |

FOREIGN PATENT DOCUMENTS

| JP | 6-230188 | 8/1994 |
| JP | 8-262190 | 10/1996 |
| JP | 10-39077 | 2/1998 |
| JP | 11-311693 | 11/1999 |
| JP | 2000-46983 | 2/2000 |
| JP | 2000-065975 | 3/2000 |
| JP | 2000-346993 | 12/2000 |

Primary Examiner—Michael J. Carone
Assistant Examiner—Daniel Matz
(74) Attorney, Agent, or Firm—Mattingly, Stanger & Malur, P.C.

(57) ABSTRACT

When carrying the large structure out through an aperture portion provided at a roof of a reactor building, a chamber for covering the aperture is provided at the roof so that work of providing the chamber for covering the aperture portion can be performed independent of other work performed in the reactor building. At least a part of the work of using a roof crane, and at least a part of the work of handling fuel assemblies in the reactor building can be performed in parallel with forming the roof aperture.

6 Claims, 10 Drawing Sheets

METHOD OF HANDLING A LARGE STRUCTURE IN A REACTOR BUILDING

This is a continuation application of U.S. Ser. No. 09/805,992, filed Mar. 15, 2001.

BACKGROUND OF THE INVENTION

The present invention relates to a method of handling a large structure when a large component of a nuclear power plant, such as a rector pressure vessel, a large structure member in a reactor, etc., is replaced; or decommissioning of the nuclear power plant is conducted.

A nuclear power plant is designed so that it has a sufficient margin to its life time which was required on the occasion of its construction. Further, the life time of the nuclear power plant can be extended by exchanging life-expired components/parts of the plant. In the case where a large structural component or part to be exchanged is moved into or out of a reactor building, there is sometimes a problem in that the size of a conventional entrance provided in the reactor building is too small. In this case, it is necessary to provide an aperture portion at the roof of the reactor building, through which the large structure can be passed, (hereafter, simply referred to as an aperture portion).

Here, Japanese Patent Application Laid-Open Hei 8-262190 discloses a relevant method in which, when a reactor pressure vessel (hereafter referred to as a RPV) of a large structure, is exchanged, a block of a size such that which can pass the structure through it, is cut out from the roof of the reactor building by a cutting machine using a laser beam, and the cut-out block is lifted up by a crane.

When a large structure such as a RPV is exchanged, fuel assemblies, components, and etc., are moved by using a roof crane in an operating floor of a reactor building. Therefore, it is important to reduce the stopping time of a nuclear power plant by adjusting the proceeding of work of moving components and work of providing/occluding an aperture portion at the roof of the reactor building.

Generally, a roof of a reactor building has a multilayer structure composed of a steel framework of truss structure, which reinforces the reactor building, a deck plate covering the steel framework, and a concrete layer of 100–300 mm thickness, which is made up by pouring concrete onto the deck plate. Here, it is an important subject that the work of providing/occluding an aperture portion, which is performed at the upper position of the operating floor, does not interfere with work of moving fuel assemblies, components, etc.

However, Japanese Patent Application Laid-Open Hei 8-262190 does not specifically disclose how the work of providing/occluding an aperture portion is performed. Accordingly, by the method disclosed in this document, it is inevitable that the work of providing/occluding an aperture portion interferes with the work of moving fuel assemblies, components, etc. Further, if the work of providing/occluding an aperture portion is performed over a fuel pool in which fuel assemblies are stored, extraneous parts may fall into the fuel pool. Therefore, the work of providing/occluding an aperture portion must be performed after all fuel assemblies are taken out of the RPV. Consequently, processes of exchanging a large structure such as a RPV takes a long time.

SUMMARY OF THE INVENTION

An objective of the present invention is to provide a method of handling a large structure when carrying the large structure out/in through an aperture portion provided at the roof of a reactor building, which can reduce the time necessary to carry the large structure out/in.

To achieve the above objective, the present invention provides a method of handling a large structure in a reactor building in carrying the large structure out through an aperture portion provided at a roof of the reactor building, wherein an isolation chamber for isolating work of providing the aperture portion is installed on the roof before at least a part of work of handling fuel assemblies and at least a part of work of using a roof crane, and the work of providing the aperture portion is performed in parallel with at least a part of work of handling fuel assemblies and at least a part of work of using a roof crane.

Further, the present invention provides a method of handling a large structure in a reactor building in carrying the large structure out through an aperture portion provided at a roof of the reactor building, wherein work of carrying the large structure in is performed in a state in that a chamber for covering the aperture portion, which is installed for performing work of occluding the aperture portion independent of other work performed in the reactor building, is installed at the roof; and after the work of carrying the large structure in, at least a part of work of using a roof crane in the reactor building is performed in parallel with the work of occluding the aperture portion.

Furthermore, the present invention provides a method of handling a large structure in a reactor building in carrying the large structure out through an aperture portion provided at a roof of the reactor building, the method comprising the steps of: providing a chamber for covering the aperture portion provided at the roof so that work of providing the chamber for covering the aperture portion can be performed independent of other work performed in the reactor building, before at least a part of work of handling fuel assemblies and at least a part of work of using a roof crane in the reactor building; performing the work of providing the aperture portion in parallel with at least a part of the work of handling fuel assemblies and at least a part of work of using a roof crane in the reactor building; performing the work of carrying in the large structure; and performing work of occluding the aperture portion in parallel with at least a part of the work of handling fuel assemblies and at least a part of work of using a roof crane in the reactor building after the work of carrying the large structure in.

In accordance with the present invention, when work of carrying a large structure out/in through an aperture portion provided at the roof of a reactor building, since work of providing/occluding the aperture portion can be performed in parallel with a part of handling fuel assemblies and a part of work using a roof crane, the time of total work can be remarkably reduced.

DETAILED DESCRIPTION OF THE EMBODIMENTS

Hereafter, details of the embodiments according to the present invention will be explained with reference to the drawings.

Figure 2:
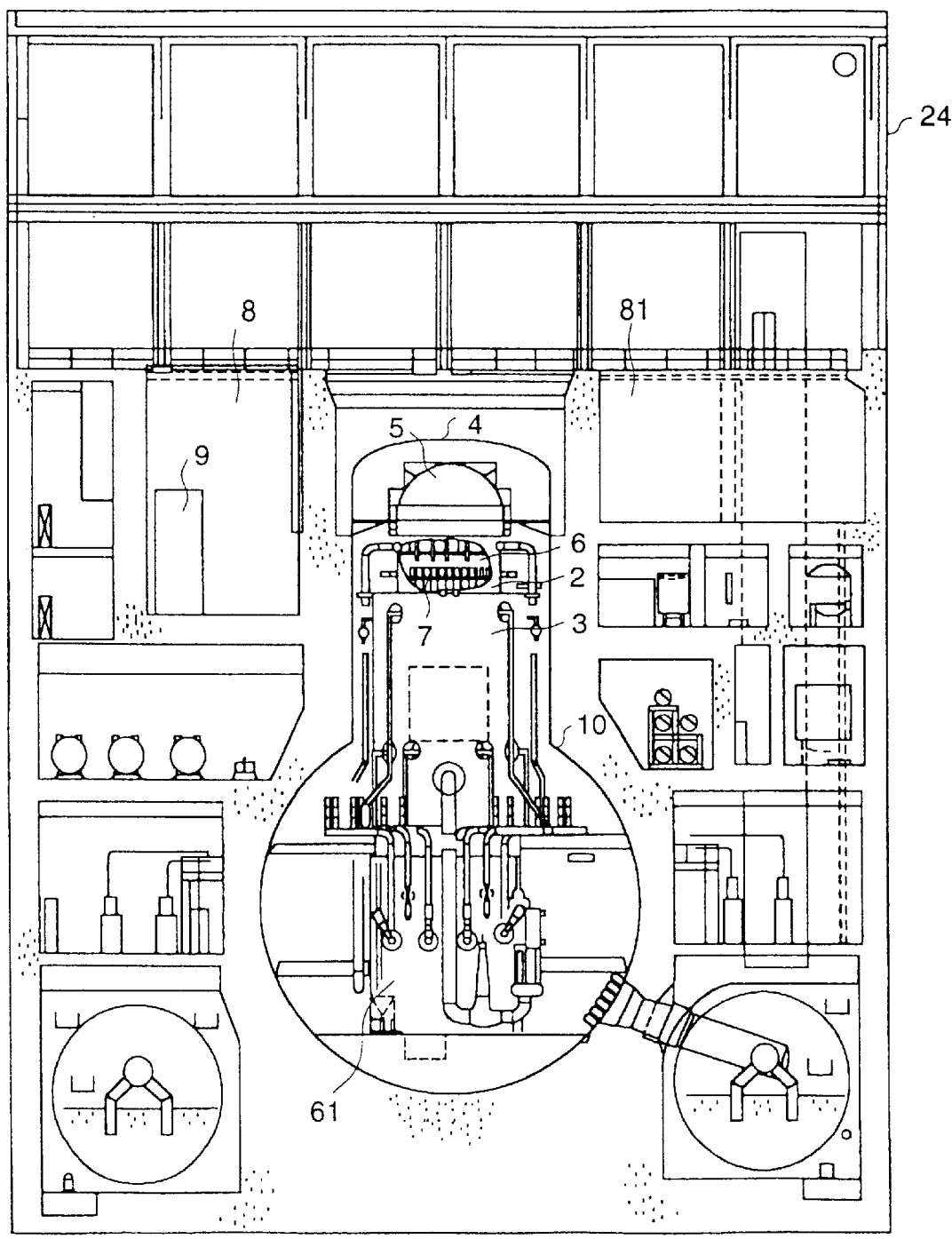
FIG. 2 is a schematic vertical cross section of a reactor building in which the method shown in FIG. 1 is performed.

In the embodiments, the present invention is applied to the exchanging of a reactor pressure vessel (RPV) 2 which is one of large structures in a reactor building 24 of a boiling water reactor type nuclear power plant. FIG. 2 shows a schematic vertical cross section of the reactor building 24. A primary containment vessel (hereafter referred to as a PCV) 10 is installed in the reactor building 24, and RPV 2 is situated in PCV 10. Also, A reactor shield wall (hereafter referred to as a RSW) 3 is situated outside RPV 2. Further, a spent fuel pool 8 and a component pool 81 are installed at the side of PCV 10, and a spent fuel rack 9 is provided in the spent fuel pool 8.

Moreover, a steam dryer (hereafter referred to as a dryer) 6 and a steam separator (hereafter referred to as a separator) 7 are situated in RPV 2. A reactor pressure vessel head (hereafter referred to as a RPV head) 5 is attached to the upper portion of RPV 2, and a primary containment vessel head (hereafter referred to as a PCV head) 10 is also attached to the upper portion of PCV 10. In the embodiments, the work of exchanging the RPV 2 is performed in the nuclear power plant of the above-described composition.

Figure 3:
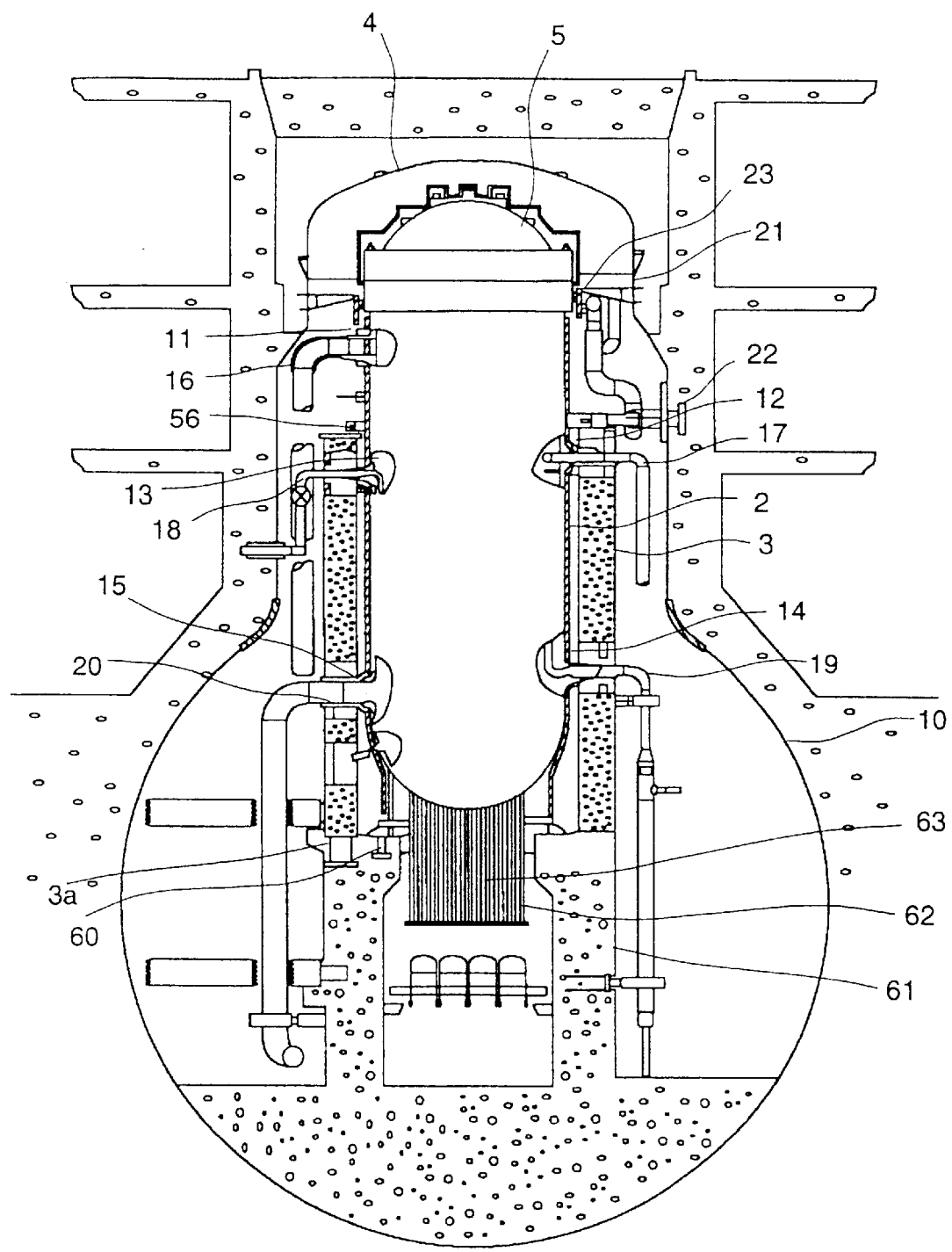
FIG. 3 is a schematic vertical cross section of the RPV shown in FIG. 2.

FIG. 3 shows a schematic vertical cross section of the RPV 2 shown in FIG. 2. A main steam nozzle 11, a feed water nozzle 12, a core spray nozzle 13, a recirculation inlet nozzle 14, and a recirculation outlet nozzle 15, are attached to the side wall of RPV 2. Further, piping systems such as main steam piping 16, feed water piping 17, core spray piping 18, and recirculation inlet piping 19, are connected the respective nozzles. RPV 2 is fixed to a RPV pedestal 61 by using base bolts 60. Also, a fuel exchange bellows 23 and a bulk head plate 21 are situated at the upper part of PCV 10. Furthermore, a housing 62 of a control rod drive mechanism (hereafter referred to as a CRD) and a housing 63 of an internal core monitor (hereafter referred to as an ICM) are situated on the RPV pedestal 61. Also, RSW 3 is fixed to the RPV pedestal 61 by using base bolts 3a. Moreover, a PCV stabilizer 22 which is an earthquake-proof support for the PCV 10, and a RPV stabilizer 56 which is an earthquake-proof support for the RPV 2, are situated at the upper part of RSW 3.

Figure 4:
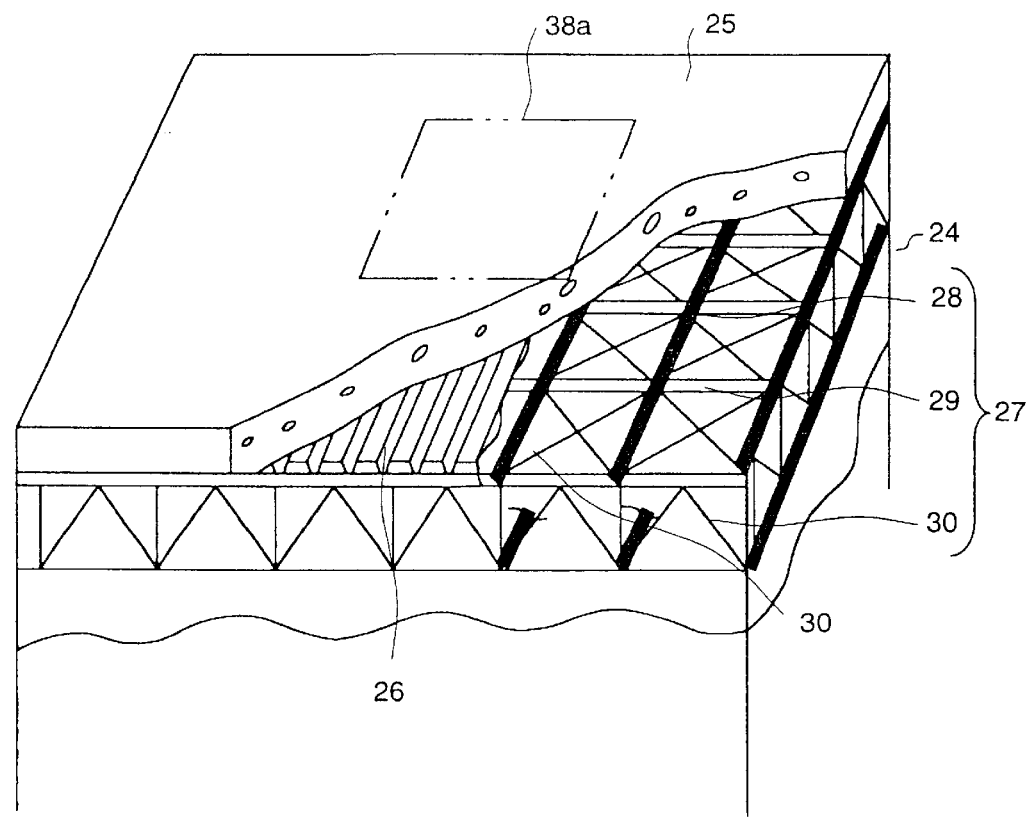
FIG. 4 is a perspective view of a partially notched roof of the reactor building.

FIG. 4 is a perspective view showing the structure of a partially notched roof of the reactor building 24. A roof truss structure 27 is composed of main beams 28, deck plate-support beams 29, and braces 30. Further, a deck plate 26 is situated on the roof truss 27. Furthermore, a concrete layer 25 is formed by pouring concrete onto the deck plate 26 and solidifying the poured concrete. Here, reference number 38a indicates a place at which the aperture portion is provided.

Figure 5A:
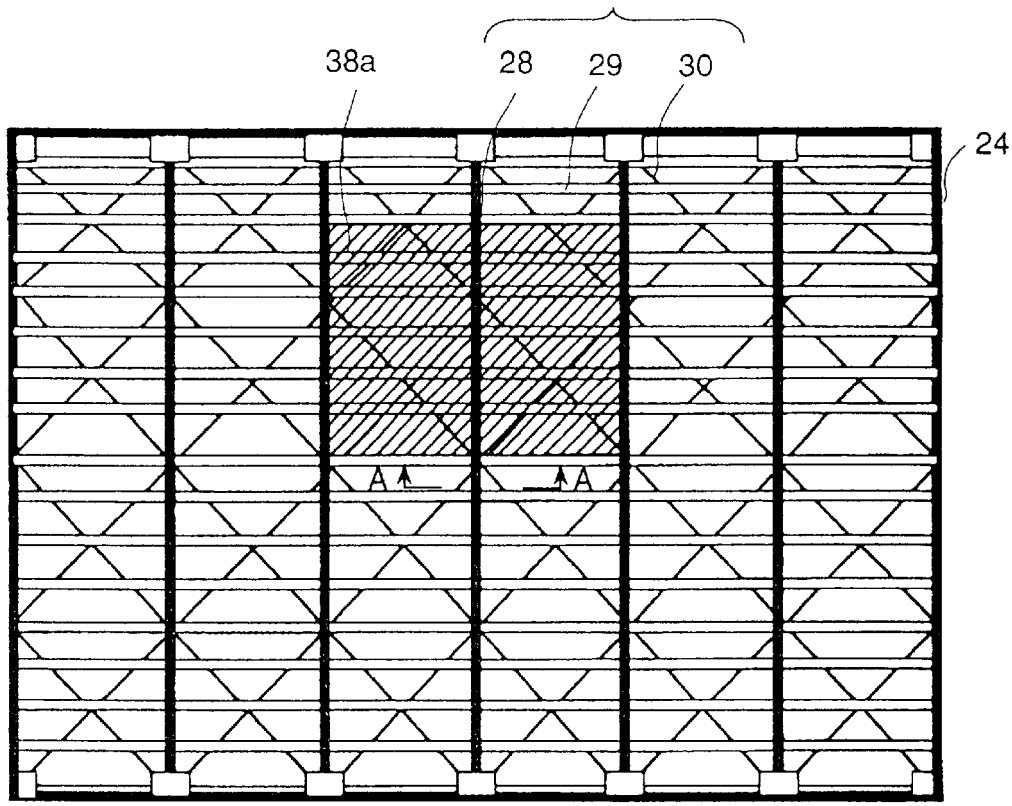
FIG. 5(a) is a plan view of the truss structure shown in FIG. 4.
Figure 5B:
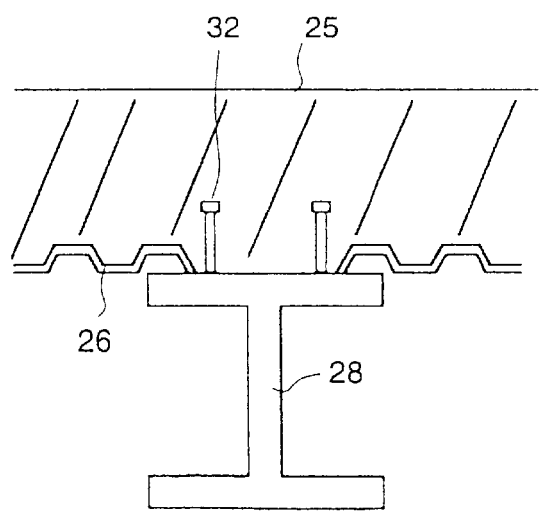
FIG. 5(b) is a cross section at line A—A shown in FIG. 5(a).

FIG. 5(a) is a plan view showing the composition of the truss structure shown in FIG. 4. The hatched part 38a indicates a region in which the aperture portion is provided. FIG. 5(b) is a cross section at line A—A shown in FIG. 5(a). Reference number 32 indicates stud bolts attached to the main beams 28.

Figure 1:
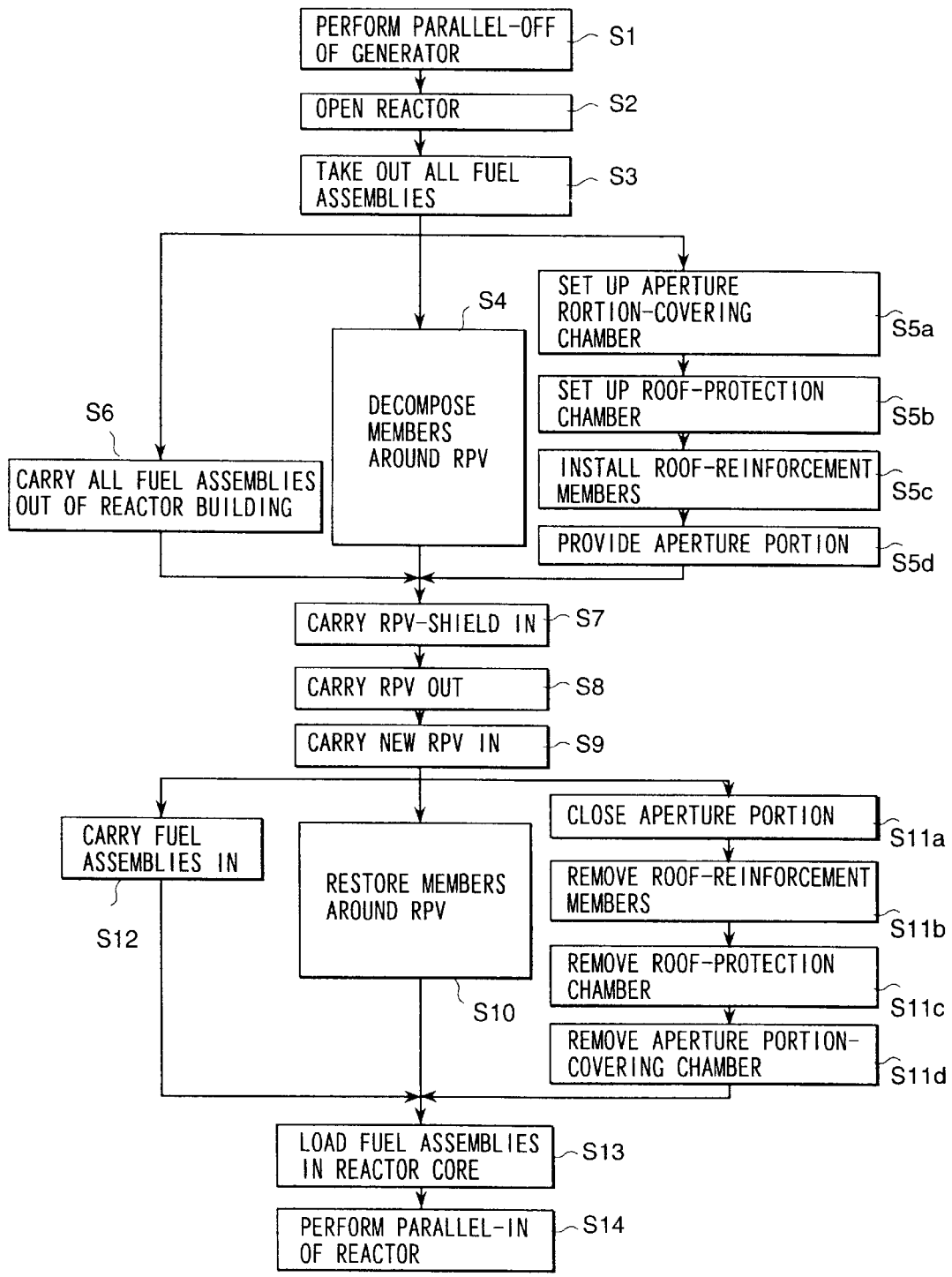
FIG. 1 is a flow chart of procedures performed by a method of an embodiment in which the present invention is applied to work of exchanging a RPV.

In the following, the work of exchanging RPV 2, which is performed in this embodiments, will be explained with reference to FIG. 1. FIG. 1 shows a flow chart of procedures of exchanging RPV 2, performed in this embodiment. First, in step S1, parallel-off of a generator is performed in order to performed the word of exchanging RPV 2, and the periodical inspection of the nuclear power plant is started.

In step S2, work of opening the reactor is performed. In this work of opening the reactor, processes of RPV head-disassembly for dismounting the RPV head 5, steam dryer-disassembly for dismounting the steam dryer 6, separator-disassembly for dismounting the separator 7, and so forth, are performed. The work of opening the reactor is the critical work to handling the fuel assemblies 80 in the core. The steam dryer 6 and the separator 7 are dismounted in every periodical inspection, and are components to be timely exchanged. Therefore, in the work of exchanging RPV 2, the steam dryer 6 and the separator 7 are transferred to the component pool 81 assuming that these components are again used.

In step S3, work of taking all fuel assemblies 80 (not shown diagrammatically) out of the core is performed. In this work of taking all fuel assemblies 80, all the fuel assemblies 80 loaded in the core are transferred to the spent fuel pool 9. Next, in step S4, the piping systems which are connected to the respective nozzles attached to RPV 2, such as the main steam piping 16, the feed water piping 17, the core spray piping 18, the recirculation inlet piping 19, the recirculation outlet piping 20, etc.; the bulk head plate 21; the fuel exchange bellows 23; and so forth; are disconnected. Further, structure members around RPV 2 are decomposed. Components and fittings, related to the above decomposition work, are transported by a roof crane 85.

In step S5a, an aperture portion-covering chamber 83 used to perform work at the aperture portion independent of other work in the reactor building 24, is installed under the place 38a at which the aperture portion is provided. The aperture portion-covering chamber 83 is also an isolation facility for isolating the work at the aperture portion. In this step, since the work of installing the chamber 83 is performed at a high position, there is fear that extraneous parts fall into the spent fuel pool 8. Accordingly, after the spent fuel pool is covered by a protection sheet, this step is performed. In other words, this work of installing the chamber 83 is performed so as not to overlap work using the spent fuel pool 8., such as the moving of fuel assemblies 80.

In this way, the work of installing the chamber 83 is completed before starting the work of carrying all fuel assemblies outside the reactor building 24, performed in step S6 which will be explained later.

Figure 6:
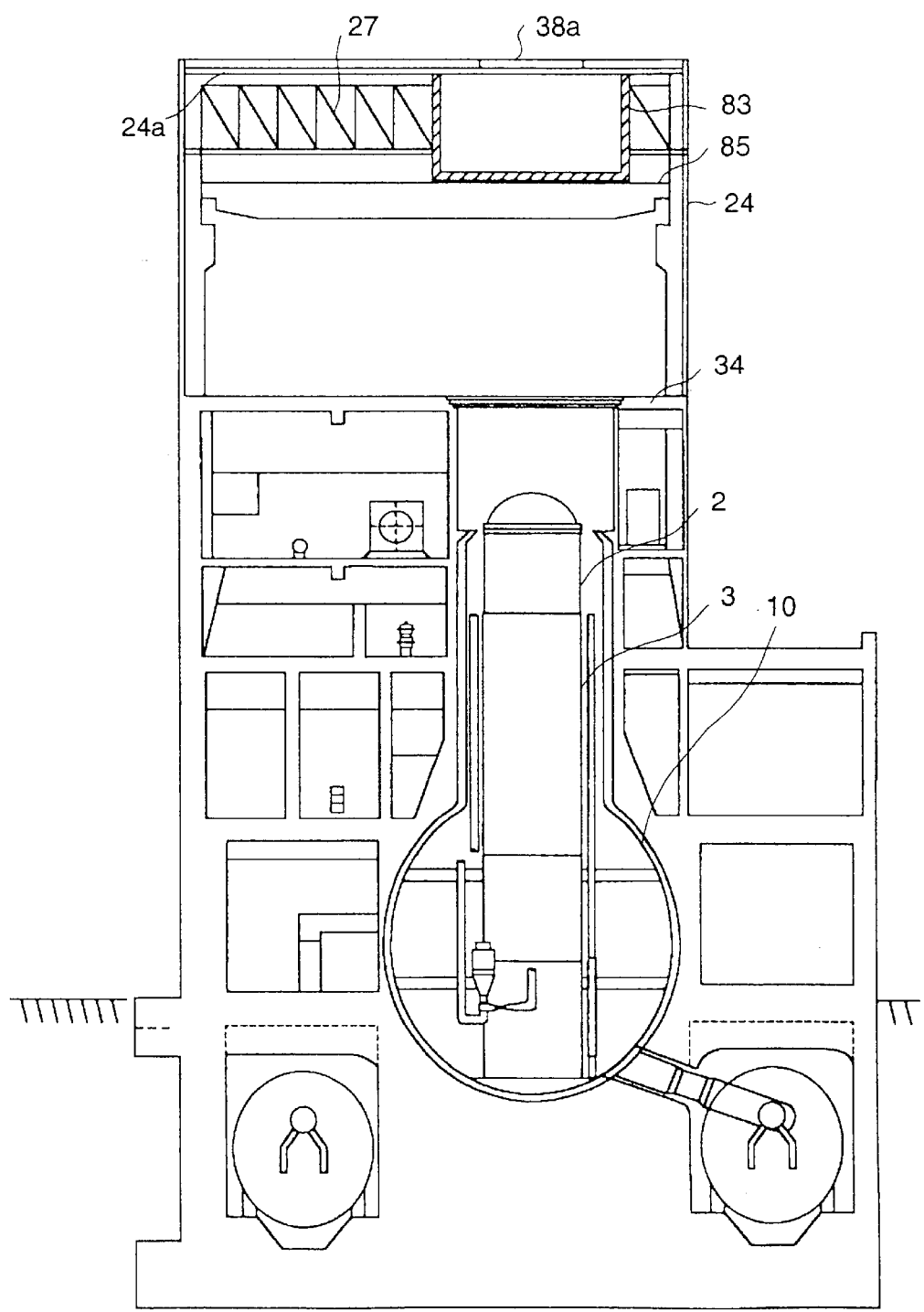
FIG. 6 is a schematic vertical cross section of the reactor building when step S5a shown in FIG. 1 is finished.

FIG. 6 is a schematic vertical cross section of the reactor building 24, showing the state in the reactor building 24 when step S5a is finished. In this figure, reference number 83 also indicates the aperture portion-covering chamber, installed under the place 83a at which the aperture portion is provided, for the work of providing/occluding the aperture portion. Reference number 27 indicates the roof truss structure for reinforcing the roof of the reactor building 24. The aperture portion-covering chamber 83 is supported by the roof 24a of the reactor building 24 or the roof truss 27, and is installed above the roof crane 85 so as not to interfere with travel motion of the roof crane 85. Also, reference number 34 indicates the operating floor on which the work of moving fuel assemblies and components is performed.

Figure 7:
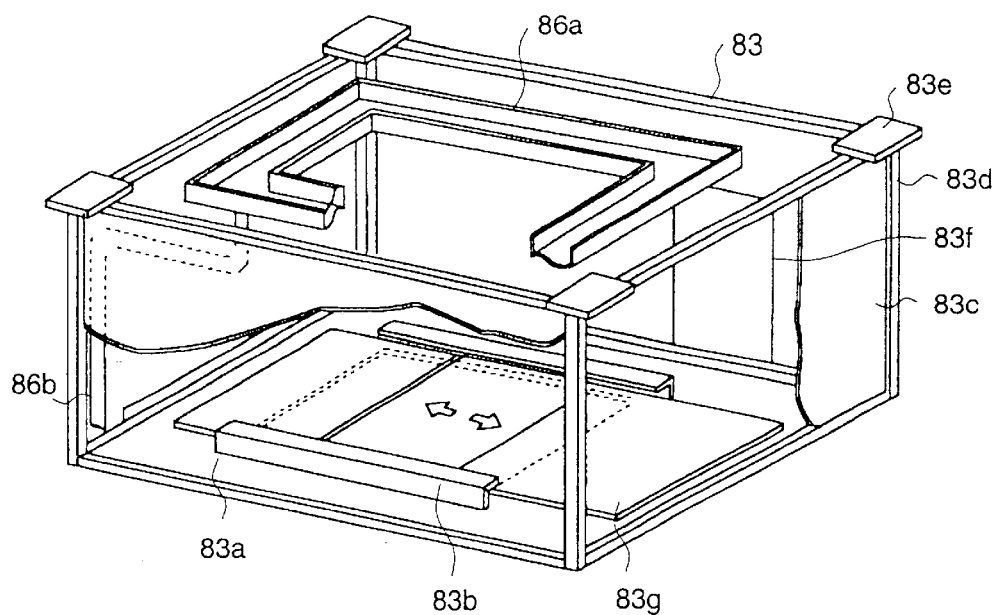
FIG. 7 is a perspective view of the partially notched aperture portion-covering chamber shown in FIG. 6.

Next, the structure of the aperture portion-covering chamber 83 is explained below with reference to FIG. 7. FIG. 7 is a perspective view of the partially notched aperture portion-covering chamber 83, showing the structure of this chamber 83. The aperture portion-covering chamber 83 has an airtight structure for preventing dust, water used for the work, etc., generated in the work of providing/occluding the aperture portion, which is performed in this chamber 83, from leaking in the reactor building 24. The floor 83a of the aperture portion-covering chamber 83 has an opened and closed portion 83b in which an opened and closed door 83g is provided. The size of the opened and closed portion 83b is a size such that which can pass a large structure in the reactor building 24 through this opened and closed portion 83b in the opening state of this portion 83b.

Further, the floor 83a and the wall 83c have the shielding ability such that which can sufficiently satisfy the reference level of skyshine radiation, in order to make it possible that the work of providing the aperture portion, performed in step S5d which will be explained later, and the work of moving all fuel assemblies 80, can be performed in parallel even if the aperture portion 38 is provided at the roof of the reactor building 24. The shielding ability satisfying the reference level of skyshine radiation means that the floor 83b and the wall 83c have the thickness required to reduce the quantity of measured radiation, which is scattered by air, to below the environmental standard level. There is a collection sluiceway 86a situated at a lower position of the space in which the roof-cutting work is performed, for collecting cut fragments or water used for the cutting work (hereafter referred to as cut fragments, etc.), which are generated in the work of cutting the roof of the reactor building 24, and preventing these cut fragments, etc., from flying in all directions. The cut fragments, etc., collected by the collection sluiceway 86a, are collected into a collection apparatus (not shown diagrammatically). Moreover, an air conditioner (not shown diagrammatically) is situated in the aperture portion-covering chamber 83 so that workers can work in the aperture portion-covering chamber 83. Here, reference numbers 83d, 83e, and 83f, indicate a frame, members for attaching the chamber 83 to the roof, and an entrance door, respectively.

Next, in step S5b, an openable roof protection chamber 84 is installed above the place 38a at which the aperture portion is provided. By installing the roof protection chamber 84, when the roof-cutting work is performed to provide the aperture portion 38, the reactor building 24, and workers and components on the roof can be protected from rain or wind. Further, this roof protection chamber 84 has a role of a shutter also.

Figure 8:
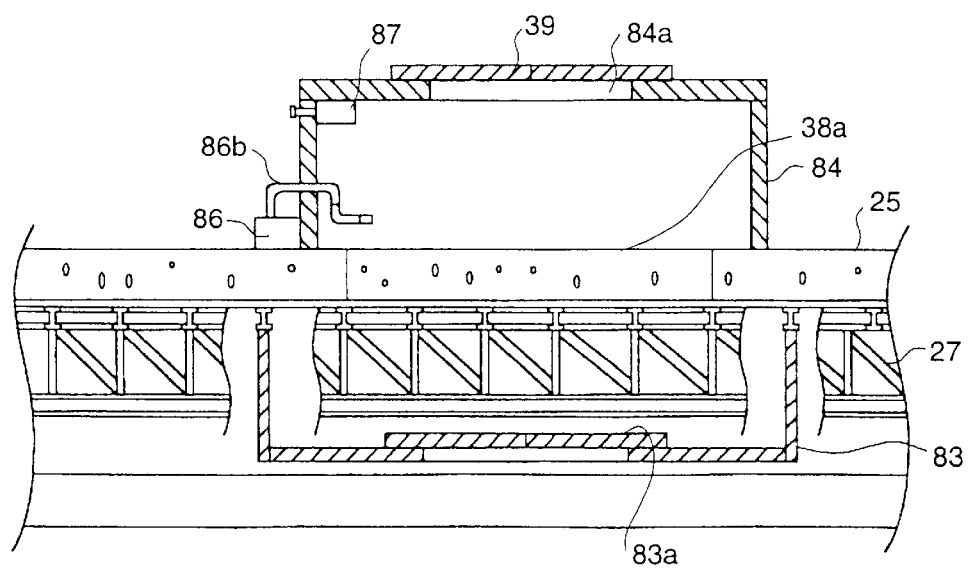
FIG. 8 is a schematic vertical cross section of the reactor building when step S5b shown in FIG. 1 is finished.

FIG. 8 is a schematic vertical cross section of the reactor building when the roof protection chamber 84 is installed in step S5b. This roof protection chamber 84 can protect the roof from rain, wind, snow, etc., and an openable shutter 39 is provided at an aperture portion 84a used for carrying a large structure out/in. The roof protection chamber 84 has an airtight structure for preventing concrete fragments, dust, work water used for the work, etc., (hereafter referred to as work water, etc.), generated by the work of providing/occluding the aperture portion 84a, which is performed in this chamber 84, from leaking outside of this chamber 84. Further, a collection sluiceway 86a, collection piping 86b, and a collection apparatus 86, are provided in order to collect the work water, etc. Furthermore, an air conditioner 87 is situated in the roof protection chamber 84 so that workers can work in this chamber 84.

Next, in step S5c, reinforcement members are attached to the roof of the reactor building 24. In the step of providing the aperture portion 38, a part of the main beams 28 for strengthening the roof is cut and removed. Before the removing of the part of the main beams 28, the rest part of the main beams 28 which are not removed for providing the aperture portion 38 (the part of the main beams 38 which remain after the providing of the aperture portion 38), is reinforced.

Figure 9A:
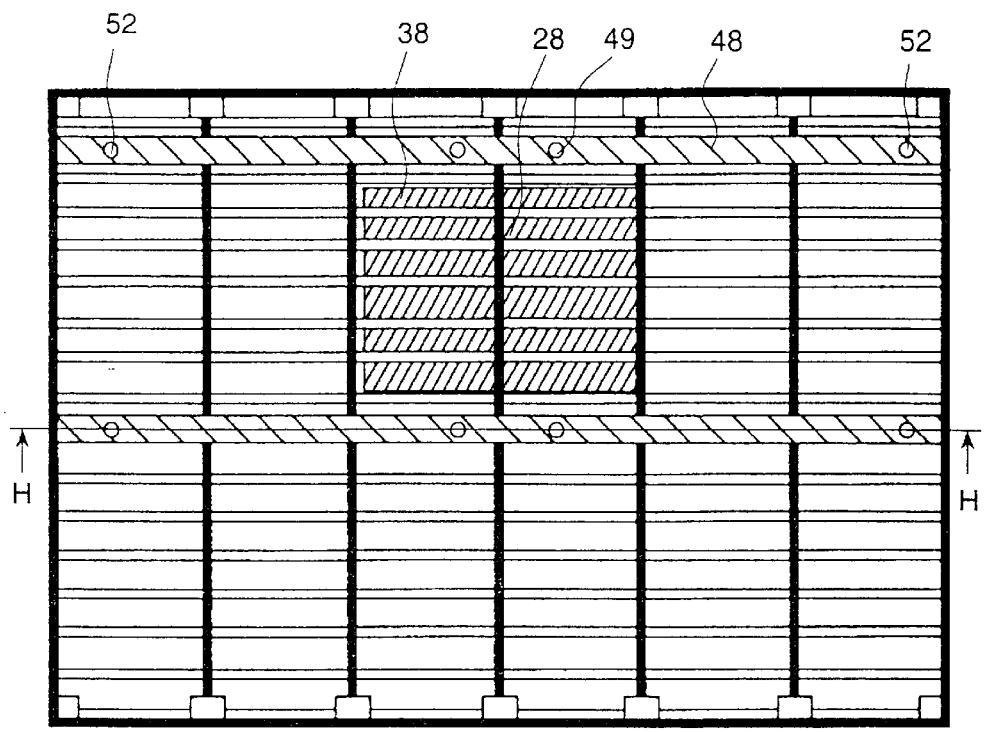
FIG. 9(a) is a schematic vertical cross section of the upper part of the reactor building when step S5c shown in FIG. 1 is finished.
Figure 9B:
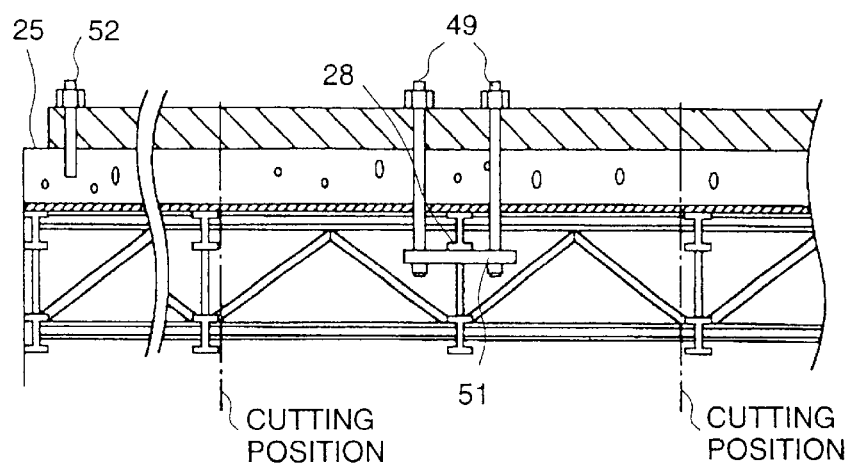
FIG. 9(b) is a cross section at line H—H shown in FIG. 9(a).

The method of reinforcing the rest of the main beams 28 is explained below with reference to FIG. 9(a) and FIG. 9(b). FIG. 9(a) shows a schematic vertical cross section of the upper part of the reactor building when the reinforcement members are attached to the roof of the reactor building 24 in step S5c. Further, FIG. 9(b) shows a cross section at line H—H shown in FIG. 9(a). In this example, the roof is reinforced by connecting the reinforcement beams 48, situated on the roof, to lower support plates 51 situated under the rest part of the main beams 28 by using reinforcement bolts 49, which remains after the providing of the aperture portion. This roof-reinforcement work is performed in the roof protection chamber 84 and the aperture portion-covering chamber 83. Reference number 52 indicates stud bolts for fixing the reinforcement beams 48 to the roof (the concrete layer).

There is another roof-reinforcement method in which posts for supporting the roof are additionally situated in the operation floor 34. However, in this method, the motion of the crane 85 is restricted, which in turn may cause an obstacle to the work of moving fuel assemblies, etc.

Figure 10:
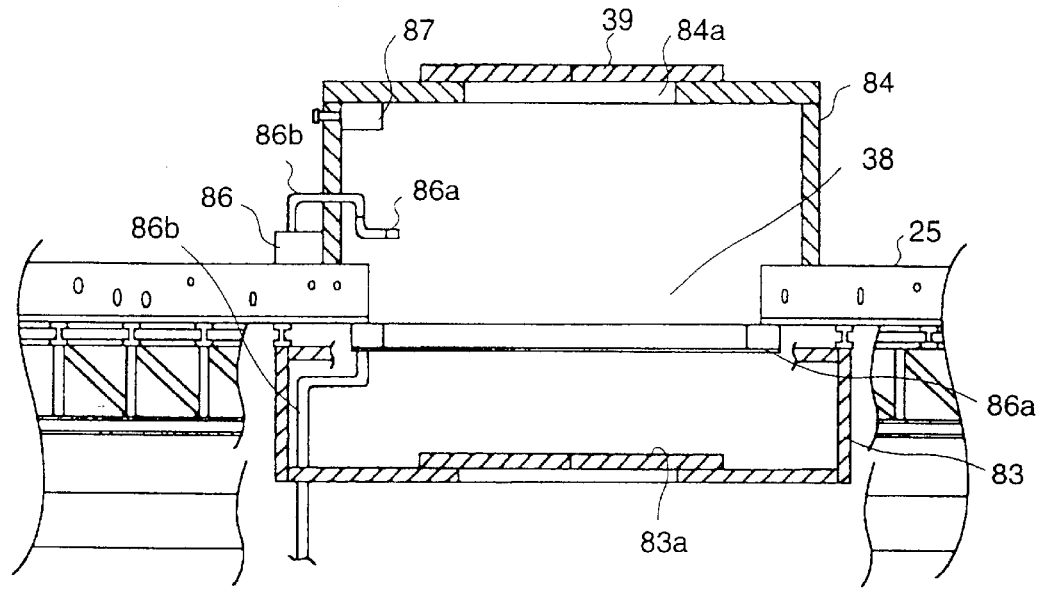
FIG. 10 is a schematic vertical cross section of the upper part of the reactor building when step S5d shown in FIG. 1 is finished.

Next, in step S5d, the aperture portion 38 is provided at the place 38a. This providing of the aperture portion 38 is performed by removing the part of the concrete layer 25, which corresponds to the place of the aperture portion 38, and by cutting and removing the part of the deck plate 26 and the roof truss 27, which is positioned under the cut part of the concrete layer 25. FIG. 10 is a schematic vertical cross section of the upper part of the reactor building when the providing of the aperture portion 38 is finished in step S5d. Since the work in step S5d is performed in the aperture portion-covering chamber 83 and the roof protection chamber 84 provided on the roof, this work can be performed independent of (separate from) the work of moving fuel assemblies 80 or components.

Next, in step S6, all fuel assemblies are carried outside the reactor building 24, and are transferred to an external storage facility. As described above, by performing the providing of the aperture portion 38 in the sealed-up and isolated aperture portion-covering chamber 83 located over the spent fuel pool 8, it is prevented that extraneous parts fall into the spent fuel pool 8. Accordingly, it is possible to simultaneously perform the work of transferring all fuel assemblies 80 to the external storage facility, which is performed in step S6, and the work of providing the aperture portion 38, which is performed in step 5d.

Figure 11:
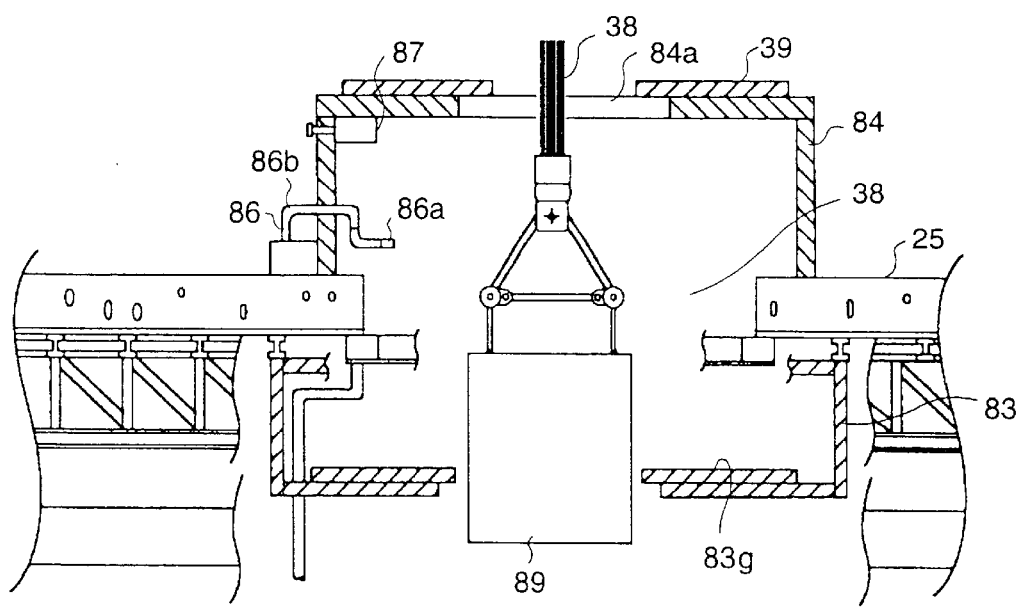
FIG. 11 is a schematic vertical cross section of the upper part of the reactor building during the process of step S7 shown in FIG. 1.

Next, in step S7, the RPV shield facility 89 is carried inside the reactor building 24 through the aperture portion 38. FIG. 11 is a schematic vertical cross section of the upper part of the reactor building when the carrying-in of the RPV shield facility 89 is performed in step S7. In this step, the shutter 39 of the roof protection chamber 84 installed on the roof, and the opened and closed door 83g of the aperture portion-covering chamber 83, are opened, and the RPV shield facility 89 is carried-in by the crane 36 situated outside the reactor building 24. Further, the carried-in RPV shield facility 89 is temporarily laid on the upper part of RSW 3. After the carrying-in of the RPV shield facility 89, the shutter 39 of the roof protection chamber 84 installed on the roof, and the opened and closed door 83g of the aperture portion-covering chamber 83, are closed so as to prevent radioactive substances from leaking outside the reactor building 24.

Next, in step S8, RPV 2 put in the RPV shield facility 89 is taken out through the aperture portion 38. In this step, the RPV stabilizer 56 and the base bolts 60 attached to the upper part of RPV 2 are detached, and RPV 2 is lifted up by the crane 36 situated outside the reactor building 24. Further, the lifted-up RPV 2 is put in the RPV shield facility 89 temporarily laid on RSW 3 by the crane 36. Then, RPV 2 is taken out along with the RPV.

Figure 12:
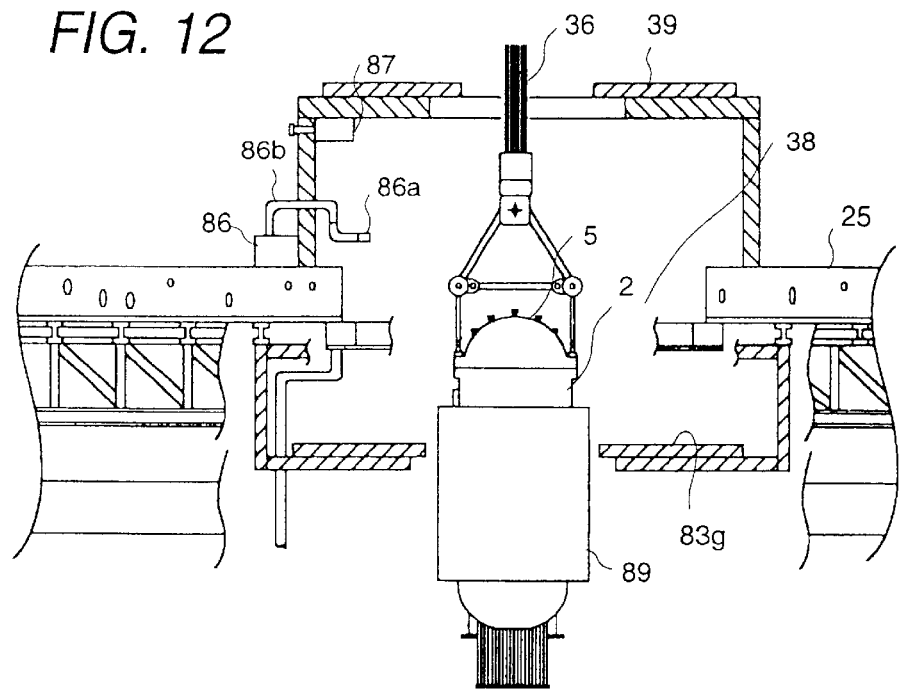
FIG. 12 is a schematic vertical cross section of the upper part of the reactor building during the process of step S8 shown in FIG. 1.

FIG. 12 is a schematic vertical cross section of the upper part of the reactor building when RPV 2 is taken out along with the RPV in step S8. In this step as well as in step S7, the shutter 39 of the roof protection chamber 84 installed on the roof, and the opened and closed door 83g of the aperture portion-covering chamber 83, are opened, and the RPV shield facility 89 and RPV 2 are carried outside the reactor building 24 by the crane 36 situated outside the reactor building 24. In this embodiment, after the RPV shield facility 89 and RPV 2 are carried outside the reactor building 24 while both the door 83g and the shutter 39 of the roof protection chamber 84 are opened, the door 83g and the shutter 39 of the roof protection chamber are closed. Also, a method of sequentially closing the door 83g and the shutter 39 when the RPV shield facility 89 and RPV 2 are raised up, is possible, in which the door 83g is first closed if the bottom portion of the door 83g and the shutter 39 is lifted up above the door 83g, and the shutter 39 is next closed if the bottom portion of the door 83g and the shutter 39 is lifted up above the shutter 39.

Figure 13:
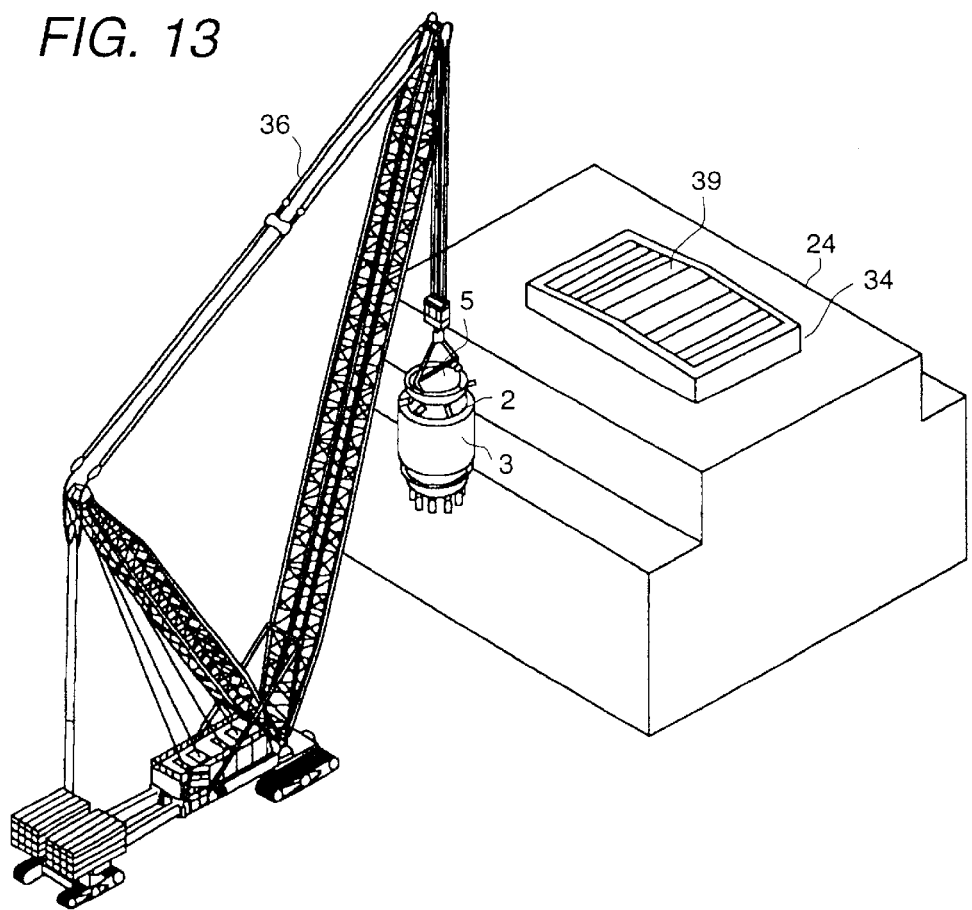
FIG. 13 is a schematic perspective view of the situation around the reactor building when step S8 shown in FIG. 1 is finished.

When the carrying-out of RPV 2 is completed, the shutter 39 of the roof protection chamber 84 installed on the roof, and the opened and closed door 83g of the aperture portion-covering chamber 83, are closed so as to prevent radioactive substances from leaking outside the reactor building 24. FIG. 13 is a schematic perspective view of the situation around the reactor building when the carrying-out of the RPV shield facility 89 and RPV 2 is finished in step S8. In this way, a series of procedures for the work of carrying RPV 2 out is completed.

Next, in step S9, a new RPV is carried-in through the aperture portion 38. In this step as well as in step S7, the shutter 39 of the roof protection chamber 84 installed on the roof, and the door 83g of the aperture portion-covering chamber 83, are opened, and the new RPV is carried-in the reactor building 24 by the crane 36 situated outside the reactor building 24. When the carrying-in of the new RPV is finished, the shutter 39 of the roof protection chamber 84 installed on the roof and the door 83g of the aperture portion-covering chamber 83, are closed.

Next, in step S10, structures around RPV 2, such as the bulk head plate 21, the fuel exchange bellows 23, the piping systems connected to the respective nozzles attached at RPV 2, and so forth, are reconstituted. In this reconstitution work, components and fittings related to this work are moved by the roof crane 85.

Next, in step S11a, the work of occluding the aperture portion 38 is performed in the aperture portion-covering chamber 83. In this step, the respective parts of the roof truss 27 and the deck plate 26, which have been removed in step S5d, are restored, and the removed part of the concrete layer 25 is put into the original place. This aperture portion-occluding work is performed in the sealed-up aperture portion-covering chamber 83. Therefore, the work in this step as well as that in step 5d can be performed in parallel with the work of carrying fuel assemblies 80 in the reactor building 24, which is performed in step S12 explained later.

Next, in step S11b, the roof-reinforcement beams 48 and the reinforcement bolts 48, which have been attached in step S5c, are removed. Further, in step S11c, the roof protection chamber 84 installed in step S5b is disassembled and removed.

Next, in step S11d, the aperture portion-covering chamber 83 installed in step S5a is disassembled and removed. In this step, since the work of removing the chamber 83 is performed at the roof of the reactor building 24, which is located at a high position, there is fear that extraneous parts fall into the spent fuel pool 8. Accordingly, after the spent fuel pool is covered by a protection sheet, this step is performed. In other words, this work of removing the chamber 83 is performed so as not to overlap work using the spent fuel pool 8, such as the moving of fuel assemblies 80. In this way, the work of removing the chamber 83 is completed before starting the work of carrying fuel assemblies 80 in, which is performed in step S6 explained later, or after the carrying-in of fuel assemblies 80 is finished in step 12.

Next, in step S12, fuel assemblies 80 which have been transferred to the external storage facility in step S6, are carried-in the spent fuel pool 8 in the reactor building. Further, in step S13, fuel assemblies 80 laid in the spent fuel pool 8 are loaded in the core. Furthermore, in step S14, the separator 7, the dryer 6, the PCV head 4, the RPV head 5, etc., are reassembled, and the reactor is restarted. In this way, a series of procedures for the work of exchanging RPV 2 is completed.

According to the above embodiment, the work of providing the aperture portion 38, which is performed in step S5d, and the work of occluding the aperture portion 38, which is performed in step S11a, can be performed in parallel with the work of carrying out fuel assemblies, which is performed in step S6, and the work of carrying in fuel assemblies 80, which is performed in step S12, respectively. That is, by providing the aperture portion-covering chamber 83 at the roof of the reactor building 24 before at least a part of the work of handling fuel assemblies 80, at least a part of the work of handling fuel assemblies 80 can be performed in parallel with the work of providing/occluding the aperture portion 38. Thus, the time for the work of exchanging RPV 2 can be greatly reduced, and this can also reduce the stopping time of the nuclear power plant.

Meanwhile, in the above embodiment, step S5a can be executed before step S4, and step S11a can be executed before step S10. Under the above conditions, the work of providing the aperture portion 38 in step S5d and the work of occluding the aperture portion 38 in step S11a can be performed in parallel with the work of dismounting the structures around RPV 2 in step S4 and the work of reconstituting the structures around RPV 2 in step S4, respectively. That is, by providing the roof protection chamber 84 on the roof of the reactor building 24 before at least a part of the work of using the roof crane 85, at least a part of the work of using the roof crane 85 can be performed in parallel with the work of providing/occluding the aperture portion 38. This also can greatly reduce the time for the work of exchanging RPV 2. Further, in the above embodiment, step S5a can be executed before step S3. Under the above conditions, the work of providing the aperture portion 38 in step S5a can be performed in parallel with the work of taking out fuel assemblies in step S3. This also can greatly reduce the time for the work of exchanging RPV 2.

Furthermore, step S5a can be performed before starting the periodical inspection of the nuclear power plant, or step S11d can be performed before starting the periodical inspection of the nuclear power plant. Under the above conditions, the work performed in step S5a or S11d can be omitted, which in turn can further reduce the time for the work of exchanging RPV 2.

What is claimed is:

1. A method of forming an aperture portion of reactor building, wherein an isolation chamber is provided to a roof of said reactor building at a position between said roof of said reactor building and a traveling path of an overhead traveling crane in said reactor building, and an aperture portion for passing a structure therethrough is formed at a location directly above said isolation chamber of said roof of reactor building.

2. A method of forming an aperture portion of reactor building as claimed in claim 1, wherein said isolation chamber is provided with doors which are passable of said structure.

3. A method of forming an aperture portion of reactor building as claimed in claim 1, wherein doors which are passable of said structure are provided to said isolation chamber after fixing said isolation chamber at said roof of said reactor building.

4. A method of forming an aperture portion of reactor building as claimed in claim 1, wherein said structure is a reactor vessel, and said location of fixing said isolation chamber is a portion directly above said reactor vessel in said reactor building.

5. A method of forming an aperture portion of reactor building as claimed in claims 1, wherein said isolation chamber has a structure to prevent dust generated by forming operation of said aperture portion from diffusing into said reactor building.

6. A method of forming an aperture portion of reactor building as claimed in claim 1, wherein a protecting apparatus covering the location where said aperture portion is to be assembled and having doors which are passable of said structure is provided onto said roof of said reactor building prior to forming of said aperture portion.

* * * * *